United States Patent Office 2,926,166
Patented Feb. 23, 1960

2,926,166

PYRIDO (2,3-D) PYRIMIDINE COMPOUNDS AND METHOD OF MAKING

George H. Hitchings, Yonkers, N.Y., and Roland K. Robins, Tempe, Ariz., assignors to Burroughs Wellcome & Co. (U.S.A.) Inc., Tuckahoe, N.Y., a corporation of New York No Drawing. Application January 9, 1958
Serial No. 707,854

Claims priority, application Great Britain
January 4, 1954

11 Claims. (Cl. 260—256.4)

This invention relates to a new group of pyrido (2,3-d) pyrimidines and a new method for the preparation of derivatives of this ring system. These substances are of value as pharmaceutical intermediates. They also are of value as inhibitors of micro-organisms, and they have specific activity especially against plasmodia and proteous vulgaris. The latter organism is highly resistant to known chemotherapeutic agents. This property is especially marked in the 2,4-diamino derivatives bearing alkyl or aryl substituents in the pyridine moiety.

The invention is particularly concerned with a group of compounds which falls within the general Formula I, in which $R_1$ is selected from class consisting of hydrogen, lower alkyl and aryl groups, $R_2$ is selected from the class consisting of hydrogen and lower alkyl groups, $R_3$ is selected from the class consisting of lower alkyl and aryl groups and $R_2$ and $R_3$ together are selected from the class of divalent radicals consisting of trimethylene and tetramethylene.

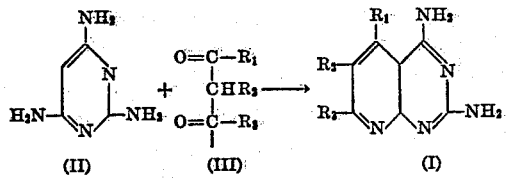

The new method of preparation of derivatives of the pyrido (2,3-d) pyrimidine system consists in the condensation of 2,4,6-triaminopyrimidine with a β-diketone or β-ketoaldehyde in a strongly acid medium such as sulfuric or phosphoric acid. The products are recovered by dilution and neutralization. In some instances the diamino derivatives are conveniently isolated as the phosphate salts.

The novel reaction of the present invention by which compounds of the general Formula I may be synthesized is shown in the above reaction between a triaminopyrimidine of Formula II and a β-carbonyl aldehyde or ketone of Formula III.

In the original conception of the above reaction, it was assumed that the more reactive carbonyl group reacted with the 4-amino group on the pyrimidine ring rather than with the 5-position. It is now found however that this is not the case but rather that the more reactive carbonyl reactions with the pyrimidine at the 5-position. Thus, β-ketonic aldehydes yield 7- rather than 5-substituted pyrido (2,3-d) pyrimidines. The structure of the compounds described in the examples is now the correct structure.

The compounds may also be prepared, according to a further feature of the present invention, by first reacting a suitably substituted 2-amino nicotinic acid of Formula IV with urea or thiourea to give a 2:4-dihydroxy or 2-mercapto-4-hydroxy-pyrido (2,3-d) pyrimidine.

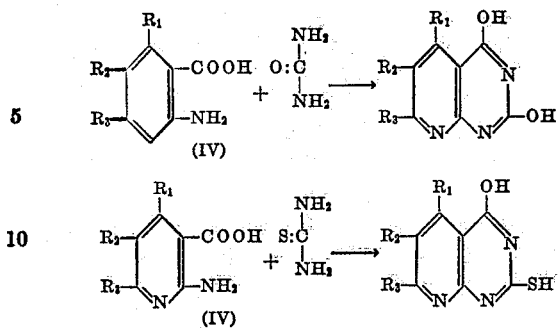

The hydroxy and mercapto groups in these compounds may undergo various further reactions to give other compounds falling within the above general Formula I. For example, treatment of the di-hydroxy compound with phosphorus oxychloride will give a di-chloro compound and this in turn by reaction with ammonia will give an amino pyrido (2,3-d) pyrimidine.

The following examples illustrate the teachings of this invention, without limitation of its scope which is defined in the claims.

EXAMPLE 1

*Preparation of 2,4-diamino-5,7-dimethyl pyrido (2,3-d) pyrimidine*

2,4,6-triaminopyrimidine (5 g.) and acetylacetone (3 g.) were heated with 25 ml. of 85% $H_3PO_4$ for 5 hours on the steam bath. The solution was diluted to 250 ml. and made basic to a pH of 9 with concentrated ammonium hydroxide. There deposited from the warm solution on standing colorless needles, melting point at 293–295° with decomposition (uncorrected).

EXAMPLE 2

*Preparation of 2,4-diamino-6-methyl-7-phenylpyrido (2,3-d) pyrimidine*

2,4,6-triaminopyrimidine (12.5 g.) and 16.2 of 3-phenyl-2-methylpropan-3 one-1-al (Berichte, vol. 22, page 3276) were added to 70 ml. of $H_3PO_4$ and heated on the steam bath for 5 hours. The solution was diluted to 500 ml. with water and made basic to a pH of 9 with concentrated ammonium hydroxide. The precipitate was filtered and washed and suspended in 100 ml. of 2 N sodium hydroxide and heated 1 hour on the steam bath and filtered. The precipitate was recrystallized from ethanol-water mixture. Yield, 2.5 g., having a melting point of 287–290°. A small amount was crystallized from absolute ethanol for analysis.

EXAMPLE 3

*Preparation of 2,4-diamino-6-methyl-7-ethylpyrido (2,3-d) pyrimidine*

6.3 g. of 2,4,6-triaminopyrimidine and 6.8 g. of the sodium salt of 2-methyl-penta-3-one-1-al (Berichte, vol. 22, page 3277) and 40 ml. of 85% phosphoric acid were heated together as in Example 2 and the product worked up in a similar manner to give 2.2 g. of product, melting at 304–305°.

EXAMPLE 4

*Preparation of 2,4-diamino-7-(p-chlorophenyl) pyrido (2,3-d) pyrimidine*

6.3 g. of 2,4,6-triaminopyrimidine and 10.2 g. of the sodium salt of 3-(p-chlorophenyl) propan-3-one-1-al (Berichte, vol. 61, page 2253) and 120 ml. of 85% $H_3PO_4$ were heated 4 hours on the steam bath and reaction mixture worked up as in Example 2 to give 1.6 g. of a product, melting at 311°.

EXAMPLE 5

*Preparation of 2,4-diamino-7-phenylpyrido (2,3-d) pyrimidine*

The preparation of this compound was carried out as in Example 4 using 6 g. of triaminopyrimidine and 10 g. of 3-phenyl-propane-3-one-1-al, to yield yellow needles, having a melting point of 289–290°.

EXAMPLE 6

*Preparation of 2,4-diamino-5,7-diphenylpyrido (2,3-d) pyrimidine*

This preparation was carried out as in Example 1 substituting 7 g. dibenzoylmethane for the acetylacetone, to yield yellow prisms, having a melting point of 288–290°.

EXAMPLE 7

*Preparation of 2,4-diamino-6-ethyl-7-phenylpyrido (2,3-d) pyrimidine*

To 50 ml. of 85% $H_3PO_4$ was added 6.3 g. of 2,4,6-triaminopyrimidine and 8.8 g. of 2-ethyl-3-phenyl-propanone-3-al-1 (Berichte, vol. 22, page 3278) and solution heated on the steam bath for 4 hours and the reaction mixture worked up as in Example 2 to yield 2.1 g. of white needles, melting at 281–282°.

EXAMPLE 8

*Preparation of 2,4-diamino-6-ethyl-7-n-propylpyrido (2,3-d) pyrimidine*

Eight and two tenths grams of the sodium salt of 2-ethylhexone-3-one-1-al and 63 g. of 2,4,6-triaminopyrimidine were heated in 40 ml. of phosphoric acid for 2 hours on the steam bath to yield 2.1 g. of crude product. (Isolated as in previous examples.) Recrystallization from ethanol yielded 1.4 g., having a melting point of 197°.

EXAMPLE 9

*Preparation of 2,4-diamino-5,6,7-trimethylpyrido (2,3-d) pyrimidine*

Eight grams of 2,4-dihydroxy-5,6,7-trimethylpyrido (2,3-d) pyrimidine was added to 100 ml. of phosphorus oxychloride and the solution refluxed 2 hours, the excess phosphorus oxychloride was distilled off under reduced pressure and the syrupy residue poured on ice and extracted with chloroform. The residue from the chloroform extraction, which consisted of crude 2,4-dichloro-5,6,7-trimethylpyrido (2,3-d) pyrimidine, was heated with alcoholic ammonia at 155° overnight and the product isolated as in Example 8 to yield 0.6 g. of product, melting at 314°.

EXAMPLE 10

*Preparation of 2,4-diamino-6,7-dimethylpyrido (2,3-d) pyrimidine*

From 12.5 g. of 2,4,6-triaminopyrimidine and 12.2 g. of the sodium salt of 2-methyl butanone-3-al-1 dissolved in 100 ml. of 85% phosphoric acid and heated 4 hours on the steam bath was isolated as in Example 2, 2.4 g. of a product, melting at >350° with decomposition.

EXAMPLE 11

*Preparation of 2,4-diamino-6,7-trimethylenepyrido (2,3-d) pyrimidine*

Forty-one grams of 2,4,6-triaminopyrimidine and 44 g. of the sodium salt of 2-formylcyclopentanone were heated together for 5 hours in 150 ml. of 85% phosphoric acid. The solution was then diluted to 500 ml. with water and then neutralized to a pH of 9 with concentrated ammonium hydroxide and filtered. The crude precipitate was dissolved in dilute hydrochloric acid, heated with norite, filtered and the solution made basic with sodium hydroxide. The yield was 13.0 g., melting at >360°. A small amount was recrystallized twice from ethanol-water for analysis.

EXAMPLE 12

*Preparation of 2,4-diamino-6,7-tetramethylenepyrido (2,3-d) pyrimidine*

6.3 g. of 2,4,6-triaminopyrimidine and 6 g. of formylcyclohexanone were reacted together and the product isolated as described for the formylcyclopentanone derivative in Example 11, to give 6,7-tetramethylenepyrido (2,3-d) pyrimidine.

The following further compounds were also prepared in the above manner.

(13) 2:4 - diamino-6-ethyl-7-p-chlorphenylpyrido (2,3-d) pyrimidine melting at 258–259°.

(14) 2:4 - diamino - 6 - propyl-7-phenylpyrido (2,3-d) pyrimidine melting at 245–247°.

(15) 2:4-diamino-6-methyl-7-n-butylpyrido (2,3-d) pyrimidine melting at 280–283°.

(16) 2:4 - diamino-6-isopropyl-7-isobutylpyrido (2,3-d) pyrimidine melting at 269–270°.

(17) 2:4 - diamino-6-n-butyl-7-phenylpyrido (2,3-d) pyrimidine melting at 292–293°.

(18) 2:4-diamino-6-n-propyl-7-n-butylpyrido (2,3-d) pyrimidine melting at 195–197°.

(19) 2:4 - diamino-7-p-bromophenylpyrido (2,3-d) pyrimidine melting at 320°.

(20) 2:4-diamino-7-p-tolypyrido (2,3-d) pyrimidine melting at 323–325°.

EXAMPLE 21

*Preparation of 2,4-diaminopyrido (2,3-d) pyrimidine*

To 20 ml. of absolute ethanol saturated at 0° with dry ammonia was added 6.5 g. of crude 2,4-dichloropyrido (2,3-d) pyrimidine. The solution was then placed in a bomb and heated at 150° for 12 hours. To the alcoholic solution was then added 30 ml. of water and 10 ml. of 2 N sodium hydroxide and the solution gently warmed on the steam bath and then cooled 5 hours in the refrigerator. The precipitate was filtered, washed with a little water and recrystallized from 500 ml. of a 50% ethanol-water mixture to which had been added 0.5 ml. of 2 N sodium hydroxide. The chilled solution yielded 3.9 g. of colorless needles, melting at 356° with decomposition.

EXAMPLE 22

*Preparation of 2,4-diamino-7-methylpyrido (2,3-d) pyrimidine*

To 20 ml. of alcoholic ammonia (saturated at 0° C.) was added 1.2 g. of crude 2,4-dichloro-7-methylpyrido (2,3-d) pyrimidine and the solution heated overnight in a bomb at 155°. The excess alcohol and ammonia were evaporated on the steam bath and the residue suspended in 30 ml. of normal sodium hydroxide. The solution was filtered and recrystallized from an ethanol-water mixture. The yield of slightly yellow colored needles melting at 315° with decomposition was 0.5 g.

This application is a continuation-in-part of application Serial No. 464,625, filed October 25, 1954, now abandoned and Patents 2,749,344, 2,749,345, and 2,697,710.

What is claimed is:

1. A pyrido (2,3-d) pyrimidine of the general formula

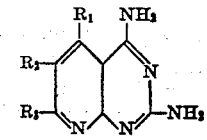

$R_1$ is selected from class consisting of hydrogen, lower alkyl and phenyl groups, $R_2$ is selected from the class consisting of hydrogen and lower alkyl groups, $R_3$ is selected from the class consisting of lower alkyl and phenyl groups and $R_2$ and $R_3$ together are selected from the class of divalent radicals consisting of trimethylene and tetramethylene.

2. 2,4-diamino-5,7-dimethylpyrido (2,3-d) pyrimidine.

3. 2,4-diamino-6,7-trimethylenepyrido (2,3-d) pyrimidine.

4. 2,4-diamino-6,7-tetramethylenepyrido (2,3-d) pyrimidine.

5. 2,4-diamino-6-propyl-7-ethylpyrido (2,3-d) pyrimidine.

6. 2,4-diamino-7-phenyl-pyrido (2,3-d) pyrimidine.

7. 2,4-diamino-6-ethyl-7-n-propylpyrido (2,3-d) pyrimidine.

8. 2,4-diamino-6-ethyl-7-phenylpyrido (2,3-d) pyrimidine.

9. 2,4-diamino-6-n-propyl-7-n-butylpyrido (2,3-d) pyrimidine.

10. 2,4-diamino-6-methyl-7-ethylpyrido (2,3-d) pyrimidine.

11. 2,4-diamino-6,7-dimethylpyrido (2,3-d) pyrimidine.

References Cited in the file of this patent

McLean et al.: J. Chem. Soc. (London), 1949, pp. 2582–2585.

Klisiecki et al.: Roczniki Chem., vol. 3, pp. 251–260 (1923).